(12) United States Patent
Hall (10) Patent No.: US 11,320,249 B2
(45) Date of Patent: May 3, 2022

(54) DEVICE AND SYSTEM FOR MEASURING LENGTH

(71) Applicant: Joseph Hall, Durham, NC (US)

(72) Inventor: Joseph Hall, Durham, NC (US)

( * ) Notice: Subject to any disclaimer, the term of this patent is extended or adjusted under 35 U.S.C. 154(b) by 0 days.

(21) Appl. No.: 16/939,910

(22) Filed: Jul. 27, 2020

(65) Prior Publication Data

US 2021/0025683 A1 Jan. 28, 2021

Related U.S. Application Data

(60) Provisional application No. 62/878,942, filed on Jul. 26, 2019.

(51) Int. Cl.
*G01B 3/00* (2006.01)
*G01B 3/04* (2006.01)

(52) U.S. Cl.
CPC .............. *G01B 3/006* (2013.01); *G01B 3/04* (2013.01)

(58) Field of Classification Search
CPC ........... G01B 3/006; G01B 3/04; G01B 3/004
USPC ................................ 33/494, 679.1
See application file for complete search history.

(56) References Cited

U.S. PATENT DOCUMENTS

| | | | | |
|---|---|---|---|---|
| 1,776,245 A * | 9/1930 | Barrett | ................... | G01B 3/004 33/494 |
| 3,270,421 A * | 9/1966 | Jones | ................... | G06G 1/0021 33/759 |
| 4,247,986 A * | 2/1981 | Burroughs | ............. | G01B 3/006 33/494 |
| 4,484,395 A * | 11/1984 | Samuels | ................... | G01B 3/04 33/494 |
| 4,750,270 A * | 6/1988 | Kundikoff | ............... | G01B 3/004 33/494 |
| 5,335,421 A * | 8/1994 | Jones, Jr. | ................ | G01B 3/004 33/494 |
| 5,746,001 A * | 5/1998 | Fisher | ..................... | G09B 23/02 33/484 |
| RE37,212 E | 6/2001 | Marshall | | |
| D538,692 S * | 3/2007 | Pacheco | ......................... | D10/71 |
| 7,774,948 B1 * | 8/2010 | Bareis | ..................... | B43L 7/007 33/494 |
| 8,021,158 B2 * | 9/2011 | Eras | ......................... | G01B 3/06 434/187 |
| 8,151,478 B2 * | 4/2012 | Kenney | ................. | A61B 5/1072 33/512 |
| 8,863,399 B2 * | 10/2014 | Steele | .................. | G01B 3/1003 33/755 |
| 9,651,348 B2 * | 5/2017 | French | .................. | G01B 3/1003 |
| 10,352,677 B2 * | 7/2019 | Stewart | ................ | G01B 3/1084 |
| 2006/0143934 A1 * | 7/2006 | Perry | ......................... | B43L 7/00 33/494 |
| 2008/0261184 A1 * | 10/2008 | Eras | ......................... | G09B 19/02 434/187 |

(Continued)

*Primary Examiner* — Yaritza Guadalupe-Mccall
(74) *Attorney, Agent, or Firm* — Kathleen M. Lynch (57) ABSTRACT

A measuring ruler, tape or other instrument having a straight edge located along at least one length of the ruler. The ruler has a first surface having a background color, and a second opposed surface. The ruler also has a set of spaced apart indicia located on the first surface along the at least one length. The indicia are oriented perpendicular to the straight edge. The width of the first indicium and last indicium of a whole number unit measurement length appear half as wide as the width of all remaining fractional indicia.

6 Claims, 9 Drawing Sheets

(56) References Cited

U.S. PATENT DOCUMENTS

| | | | | |
|---|---|---|---|---|
| 2010/0229412 A1* | 9/2010 | Kenney | ............... | A61B 5/1072 |
| | | | | 33/512 |
| 2012/0255190 A1* | 10/2012 | Hernandez | ............. | G01B 3/004 |
| | | | | 33/679.1 |
| 2015/0082644 A1* | 3/2015 | Cromwell | ............ | G01B 3/1003 |
| | | | | 33/492 |
| 2015/0168119 A1* | 6/2015 | French | ................ | G01B 3/1003 |
| | | | | 33/494 |
| 2017/0261300 A1* | 9/2017 | Jost | ........................ | G01B 3/004 |
| 2019/0113321 A1* | 4/2019 | Liang | ........................ | G01B 3/04 |
| 2021/0025683 A1* | 1/2021 | Hall | ........................ | G01B 3/04 |

\* cited by examiner

DEVICE AND SYSTEM FOR MEASURING LENGTH

FIELD

A measuring ruler having a straight edge located along at least one length of the ruler, a first surface and a second opposed surface. The ruler also has a set of spaced apart indicia located on the first surface of the ruler along the at least one length, the indicia being oriented perpendicular to the straight edge, whereby the first indicium and last indicium of a whole number unit measurement length appear half as wide as all remaining fractional indicia.

BACKGROUND

A typical tape measure or ruler is broken into inches and feet by vertical black lines that cross the blade or straight edge from top to bottom. In imperial measurement systems, these indicia are all one inch apart and are labeled with numerals that denote feet and inches. If the tape measure has graduations of 1/16 of an inch, then there are an additional 15 thin black lines, of varying height but equal spacing, between each full height line which indicates one inch. Typically, these fractions are grouped by denominators. It has been universally agreed that these indicia have a height associated with their denominator. So the indicia that marks ½ inch is the highest indicia for fractions, but is lower than the whole number indicia. The indicia for quarters is shorter than that, eighths are shorter than those, and sixteenths are shorter still. If thirty-seconds are included they are even shorter. Other than those incremental height differences the thousands of indicia on a tape measure look exactly alike.

The vast majority of tape measures or rulers that are made, sold and used in an imperial system such as here in the United States, have one-sixteenth inch graduations. Tape measures or rulers with one-eighth inch graduations are much simpler and easier to read, but are not precise enough for most uses. One-eighth tapes are usually only available on 50 to 100 foot reel-tapes which are used to measure great distances where greater precision is not needed. Tapes with thirty seconds of an inch graduations, for very precise work, have so many lines packed together, they are difficult to read. The bestselling tape measures which have thirty seconds of an inch graduations, only have them printed on the first two feet of the tape. After that the blade reverts back to sixteenths of an inch graduations.

It should be noted that by changing a tape with graduations indicating every sixteenths of an inch to graduations indicating every thirty second of an inch all graduations become difficult to read. This is because all indicia in present measuring tapes and rulers are almost identical and it is hard to discern one from another.

The embodiments described herein fulfill a need to provide for a measuring tape or ruler that is easier to read and enables the user to make a more accurate measurement.

DETAILED DESCRIPTION

Figure 1:
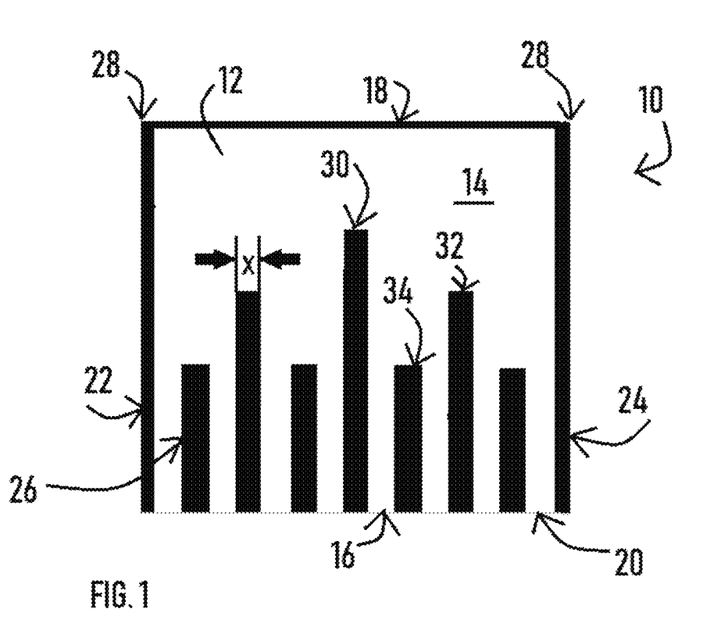
FIG. 1 is a front view of the first embodiment described herein.

The embodiments described herein are directed to tape measures and rulers and any other implement that measures length. A first embodiment 10 is shown in FIG. 1. The first embodiment 10 includes an inch section of an imperial ruler 12 having a first surface 14 and a second opposing surface (not shown).

It should be noted that many of the embodiments disclosed herein disclose only an inch or two section of an imperial ruler or other measuring device such as a measuring tape, yardstick, or any other implement, tool, length, or the like designed to measure a length. The embodiments shown herein are for illustration and example purposes and thus it is understood that the inch section shown in FIG. 1 would be repeated twelve times on a ruler and thirty six times on a yard stick, etc.

The inch section of the ruler 12 of the first embodiment 10 has a first 16 and second 18 parallel lengths. A straight edge 20 is located along the first length 16. The inch section of the ruler 12 also has first and second ends 22 and 24 respectively indicating the beginning and end of the one-inch section.

The inch section of the ruler 12 has indicia 26 displayed on the first surface 14. The end unit indicia 28 are those indicia indicating zero inches and one inch. The unit end indicia 28, located at the zero inch mark which is the edge of the first end 22, and at the one inch mark, are half as wide as all remaining indicia 26.

In the first embodiment 10, the indicia 26 and end indicia 28 are displayed at one-eighth of an inch graduations. Each indicium 26 is displayed at a width of one-sixteenth as indicated by "x" in FIG. 1, and each of the end unit indicium 28 are displayed at one-thirty second, which is one half of one-sixteenth, as shown in FIG. 1.

Figure 2:
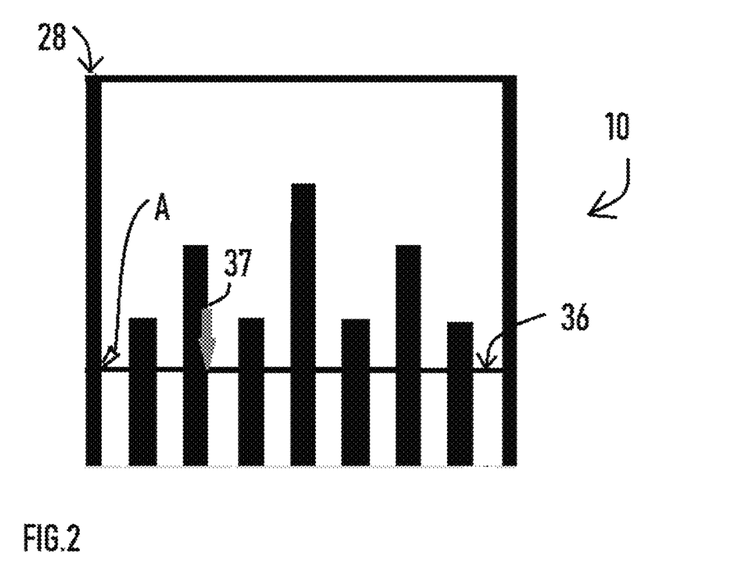
FIG. 2 is a front view of an alternative design to the first embodiment of FIG. 1.

As can be seen from FIG. 1, half-inch indicia 30 are the longest indicia of the unit except for the end unit indicia 28. The next longest indicia are one-fourth indicia 32. One eighth indicia 34 are the shortest indicia in FIG. 1. In this first embodiment 10, a horizontal line 36 is displayed at a location approximately half way along the height of the one-eighth indicia 34, as shown in FIG. 2. The intersection of the horizontal line 36 and the first end unit indicium 28 locate a measurement of one thirty-second of an inch. As can be seen in FIG. 2, a first thirty-second is located at the intersection of the end unit indicia 28 and the horizontal line 26, indicated by "A". Each subsequent measurement in the unit can be measured along the horizontal line 36 in increments of one-sixteenth.

In addition, because of the simplicity and clarity of the display of the indicia of the first embodiment 10, it is easy to measure down to the thirty seconds by selecting a half-way point between the one-sixteenth increments. For example, in FIG. 3 the measurement came to the arrow indicated at 37, the measurement can be easily measured by counting the thirty second increments. Starting from the left, there is the end unit indicia 28 which is one thirty-second in width. Knowing that each indicia is one sixteenth of an inch wide, the black indicium can each be counted as two thirty seconds, and each void or white space can be counted as two thirty seconds as well. Then moving to the right on the horizontal line 36, there are two white spaces and two black indicia. Thus the measurement is $1/32 + 8/32 = 9/32$.

Figure 3:
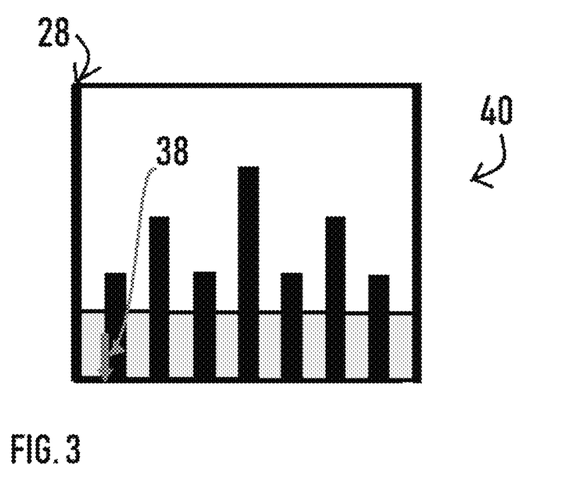
FIG. 3 is a front view of the second embodiment described herein.

A second embodiment 40 of a one-inch section of a ruler or measuring tape is shown in FIG. 3. The second embodiment 40 is similar in many respects to the first embodiment 10, however the space created below the horizontal line 36 and the straight edge 20 is provided in a color, thereby creating colored spaces 42 which indicate sixteenth gradations. As shown above, the black indicia of FIGS. 2 and 3 display halves, quarters and eighths. However, the end unit indicium 28 is half of a sixteenth, or one thirty-second in width. As such each subsequent indicium, black or colored, is an odd numbered fraction of a thirty-second. For example, in FIG. 3, arrow "38" is located at the intersection of the first full black indicium 26 and the first full colored space 42 to the right of the end unit indicium 28 marking the "zero" point. It is easy to measure the length between the "zero" mark indicated by the end unit indicium 28 and the location of arrow B by adding one-sixteenth and one thirty-second, which is three thirty-seconds. Thus, the embodiment of FIG. 3 provides an easy and accurate way of measuring length to the thirty-seconds of an inch.

Figure 4:
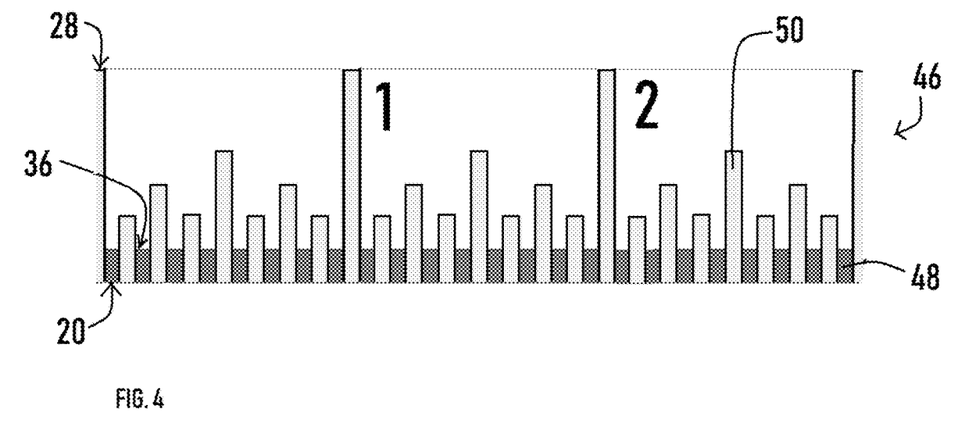
FIG. 4 is a front view of the third embodiment described herein.

A third embodiment 46 is shown in FIG. 4. The third embodiment 46 is a three-inch section of a ruler or measuring tape and is similar in some respects to the second embodiment 40 shown in FIG. 3. In the third embodiment 46, the area between the horizontal line 36 and the straight edge 20 is displayed in blue or becomes blue colored space 48. Each blue colored space 48 is one sixteenth of an inch wide and marks the sixteenth inch graduations.

The third embodiment indicia 50 are shown in yellow with black lining. The third embodiment indicia 50 in yellow indicate gradations of halves, quarters and eighths of an inch. The intersection of the yellow indicia 50 and blue colored space 48 is indicated in FIG. 4 and is a gradation of one thirty-second of an inch. The black vertical lines are one-dimensional indicia which mark thirty-seconds of an inch at their exact points.

If the indicia 26 are made to be one-sixteenth of an inch thick, with the exception of the end unit indicia 28 which are each one thirty-second of an inch, and are spaced apart one-sixteenth of an inch, then the indicia and spaces indicate without further labeling all sixteenths of a unit inch. Thus, alternative markings can be used to illustrate the fractional gradations. It should be noted that the selection of blue and yellow colors is for illustration purposes and that any contrasting colors may be used. The use of color has been found to enable a user to more easily distinguish various features of the embodiments.

Figure 5:
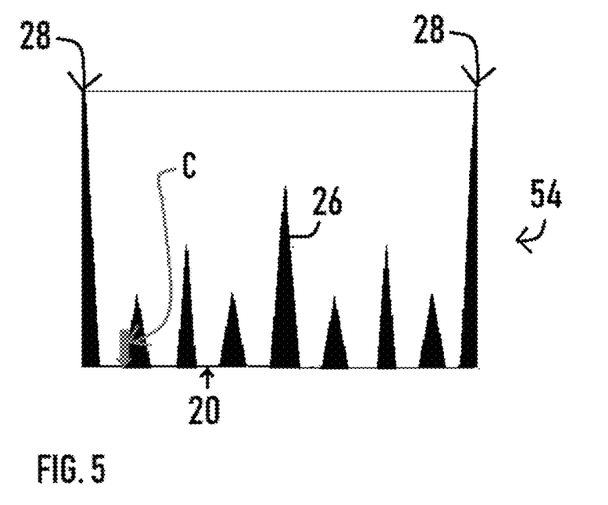
FIG. 5 is a front view of the fourth embodiment described herein.

A fourth embodiment 54 of a one-inch section of a ruler or measuring tape is disclosed in FIG. 5. The fourth embodiment 54 includes indicia 26 and end unit indicia 28 in the form of triangles. The base of each triangle is one-sixteenth of an inch wide, with the exception of the end unit indicia 28 which are only one thirty-second of an inch wide. As shown in FIG. 5, the height of the half inch indicia is greater than the height of the quarter inch indicia which is still greater than the height of the eighth inch indicia. Without labeling anything, the indicia of this unit inch is easily read, understood.

The indicia of the fourth embodiment 54 enable the user to accurately measure the length down to the one thirty-second of an inch. This is possible because each point along the straight edge 20 that is an intersection of indicia and space therebetween marks a thirty-second of an inch. It must be remembered that the end unit indicia 28 have a width at their base adjacent to the straight edge 20 of one thirty-second's of an inch. Thus each subsequent indicia base or space marks a fraction in thirty second's of an inch. For example, arrow "C" in FIG. 5 is located at the $3/32$ of an inch point along the straight edge. This is calculated by adding the "zero" end unit 28 and the first space which is one-sixteenth of an inch wide. Thus $1/32$ and $1/16$ (or $2/32$) adds up to $3/32$.

Figure 6:
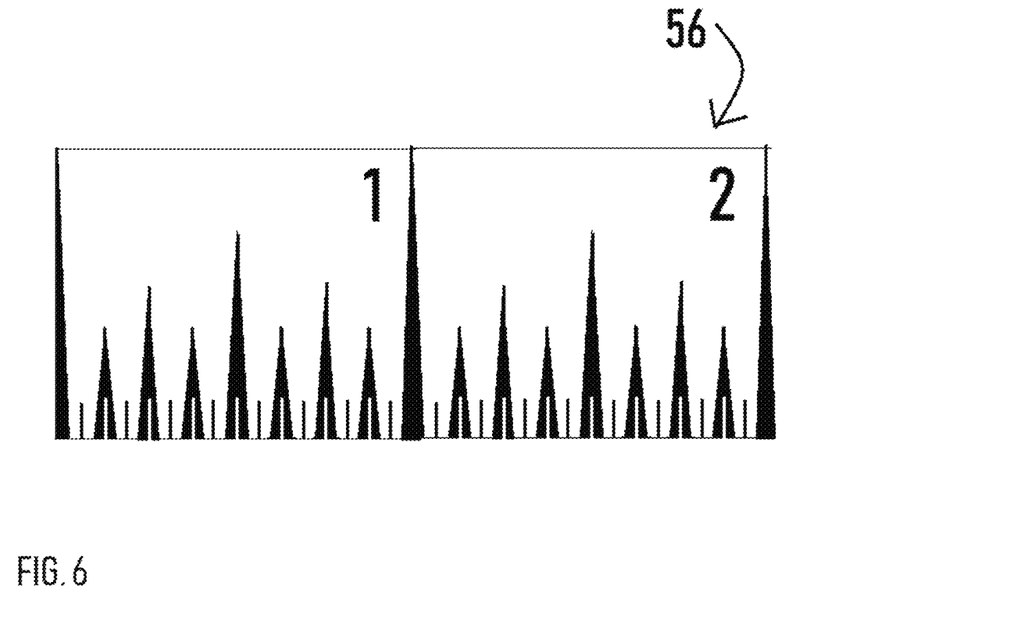
FIG. 6 is a front view of the fifth embodiment described herein.

A fifth embodiment 56 is a two-inch section of a ruler or measuring tape and is shown in FIG. 6. The fifth embodiment 56 shows indicia as both the traditional one-dimensional vertical lines and indicia as two-dimensional planes. The one-dimensional indicia are centered within the two-dimensional indicia. The widths along the bottom of the blade which are created by the black triangle bases mark halves, quarters and eights with their error of margin. The short white vertical lines centered on the triangles' bases, mark the exact points of halves, quarters and eighths. The widths along the bottom of the blade which are created by intersection of the white background area with the bottom edge of the blade, mark sixteenths with their margin of error. The short black vertical lines centered there, mark the exact points of halves, quarters and eighths. This embodiment 56 still enables the user to easily measure down to the $1/32$ of an inch.

Figure 7:
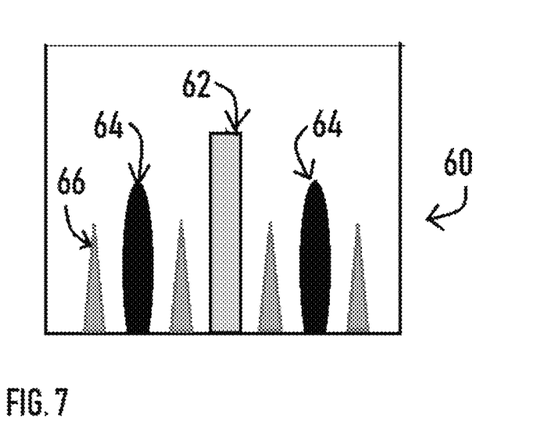
FIG. 7 is a front view of the sixth embodiment described herein.

A sixth embodiment 60 of a one-inch ruler or tape section is shown in FIG. 7. In this embodiment, shapes are primarily used as indicia. In particular, a rectangle is used to represent the half-inch indicium 62. An oval is used to represent the quarter inch indicia 64 and triangles are used to represent the one-eighth inch indicia 66. By grouping indicia fractions by shape, the overall layout or display is easier to read and understand. Additionally, by making the shape of the higher fractional value denominator indicia greater in height than the smaller fractional value denominator indicia, the reader is visually able to more easily understand each value without numerical values labelled on the tape or ruler. As seen in FIG. 7, the half-inch indicium 62 is greater in height than the quarter-inch oval indicia 64. Also, the oval quarter-inch indicia 64 are greater in height than the eighth-inch triangular indicia 66. In addition, each of the fractional indicia in FIG. 7 have a different color associated therewith. In particular, the half-inch indicium 62 is grey with black lining, the quarter-inch indicia 64 are black, and the one-eighth indicia 66 are grey with green lining. For a user, having the indicia grouped by shape and color makes the reading of the tape or ruler easier and thus results in a quicker, more accurate length measurement.

Figure 8:
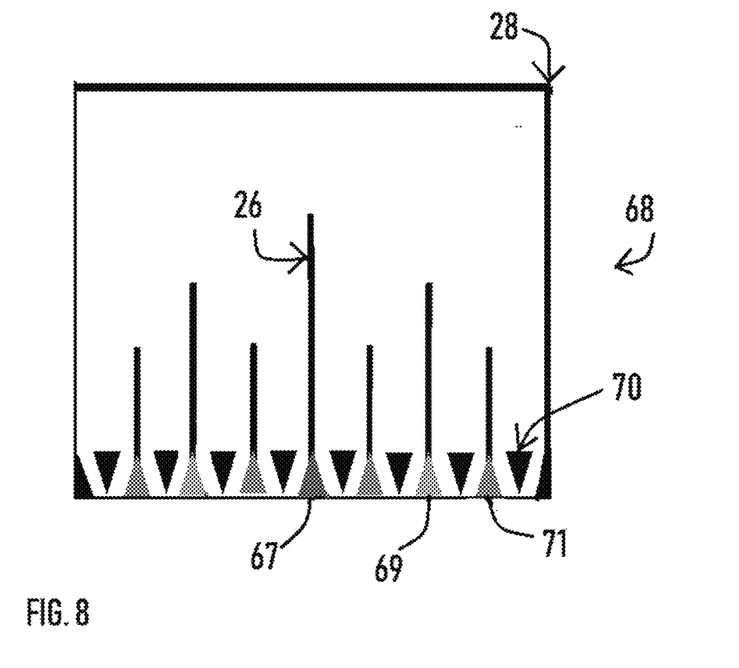
FIG. 8 is a front view of the seventh embodiment described herein.

A seventh embodiment 68 of a one-inch section of a ruler or measuring tape is shown in FIG. 8. The seventh embodiment 68 includes indicia 26 and end unit indicia 28. Each indicia 26, 28, is represented at its base by a triangle. The base of each indicia 26 is one-sixteenth of an inch wide and the base of each end unit indicia 28 is one thirty-second inch wide. There are sixteenth inch indicia 70 represented by inverted triangles where the apex illustrates the sixteenth inch gradation as does the white space along the bottom edge of the tape on which those triangles are centered. The half-inch indicium is illustrated by a blue triangle 67, the quarter-inch indicia are illustrated as orange triangles 69 and the eighth-inch indicia are illustrated as green triangles. By coloring same denominator groups together, it allows the user to easily associate the different fractional denominators for a quick and accurate measurement.

Figure 9:
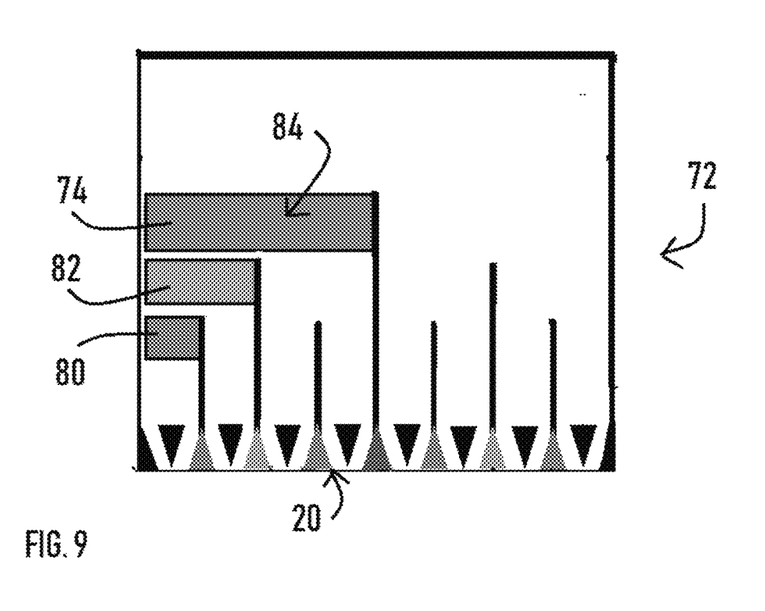
FIG. 9 is a front view of the eighth embodiment described herein.

An eighth embodiment 72 of a one-inch section of a ruler or tape measure is shown in FIG. 9. The eighth embodiment 72 includes many of the features of the seventh embodiment 68. However, the eighth embodiment 72 has numerator bands 74 extending horizontally from the "zero" mark. An eighth-inch numerator band 80 is displayed closest to the straight edge 20 and adjacent to the "zero" mark. The eighth-inch numerator band is sized to equal one-eighth of an inch. A quarter-inch numerator band 82 is located parallel to and above the eighth-inch numerator band 80. The quarter-inch numerator band 82 is sized to equal one-fourth of an inch in width. A half-inch numerator band 84 is located parallel to and above the quarter-inch numerator band 82. The half-inch numerator band 84 is sized to one-half of an inch wide and extends from the "zero" mark. Each of the numerator bands 80, 82, 84 is colored to correspond with the fraction denominator indicia 26. For instance, the eighth-inch numerator band 80 has the same color as the one-eighth inch indicia 34, in this case, it is green. The quarter-inch numerator 82 band has the same color as the one-fourth inch indicia which is shown in FIG. 9 as orange. Similarly, the half-inch numerator band 84 has the same color as the one-half inch indicia which is shown in FIG. 9 as blue. By color coordinating the numerator bands 74 with the denominator indicia 26, the tape of the eighth embodiment 72 provides the user with an easy display to enable the user to quickly and accurately measure the length.

Figure 10:
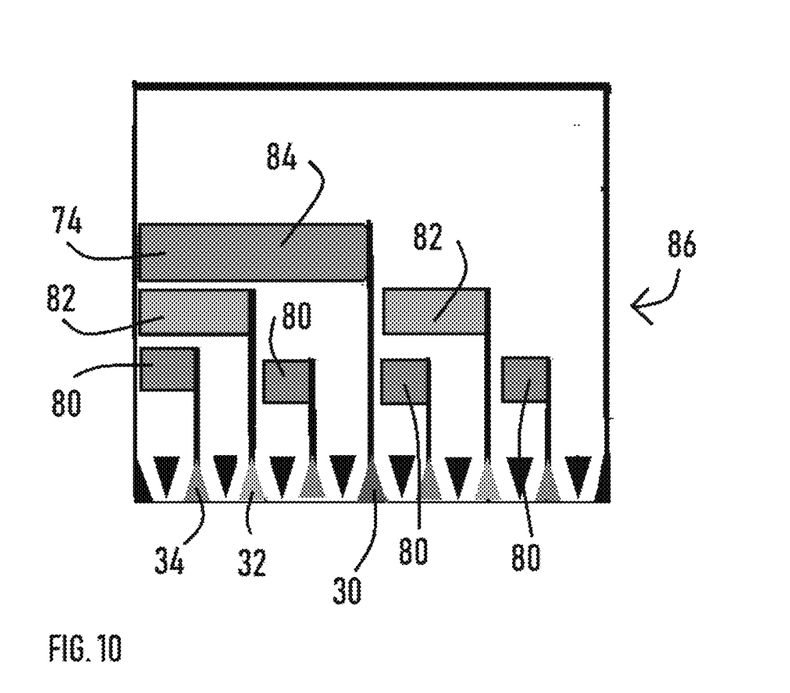
FIG. 10 is a front view of the ninth embodiment described herein.

FIG. 10 shows a ninth embodiment 86 of a one-inch section of a ruler or tape measure. The ninth embodiment 86 is similar in many respects to the eighth embodiment 72. However, the ninth embodiment 86 includes additional numerator bands 74 that alternate across the unit of measure. In particular, the ninth embodiment 86 includes three additional eighth-inch numerator bands 80. The eighth-inch numerator bands are one-eighth inch wide and extend in series and alternate across the width of the unit of measure, in this case one inch. Thus, the first eighth-inch numerator band 80 starts at the "zero" mark and extends to the one-eighth inch mark. The second eighth-inch numerator band 80 starts at the one-quarter inch mark and extends to the three-eighths inch mark. The third eighth-inch numerator band 80 starts at the half-inch mark and extends to the five-eighths mark. The fourth eighth-inch numerator band 80 starts at the three-fourths inch mark and ends at the seven-eighths inch mark. Each eighth-inch numerator band 80 is one-eighth inch in width. All of the eighth-inch numerator bands 80 are colored the same and match the color assigned to the one-eighth inch denominator indicia 34.

The quarter-inch numerator bands 82 are located above the eighth-inch numerator 80 bands in FIG. 10. As described above for the eighth-inch numerator bands 80, the quarter-inch numerator bands 82 are one-fourth of an inch in width and alternate by one-fourth of an inch across the unit of measure, in this case one inch. Thus, in FIG. 10, two quarter-inch numerator bands 82 are displayed. The first quarter-inch numerator band 82 begins at the "zero" mark and extends to the one-fourth inch mark. The second quarter-inch numerator band 82 starts at the half-inch mark and extends to the three-fourths inch mark. Because each quarter-inch band 82 is one-fourth of an inch in width and the bands are alternately displayed across the unit of measure, the spaces in between the two quarter-inch bands is also one-fourth of an inch in width. It should be noted that all of the quarter-inch numerator bands 82 are colored the same as the one-fourth inch indicia 32.

The same format described above for the one-eighth and quarter-inch numerator bands applies to the half-inch numerator band 84. The half inch numerator band 84 starts at the "zero" point and extends to the one-half inch mark. The half-inch numerator band 84 is colored the same as the one-half inch indicia 30 for ease of reference.

Figure 11:
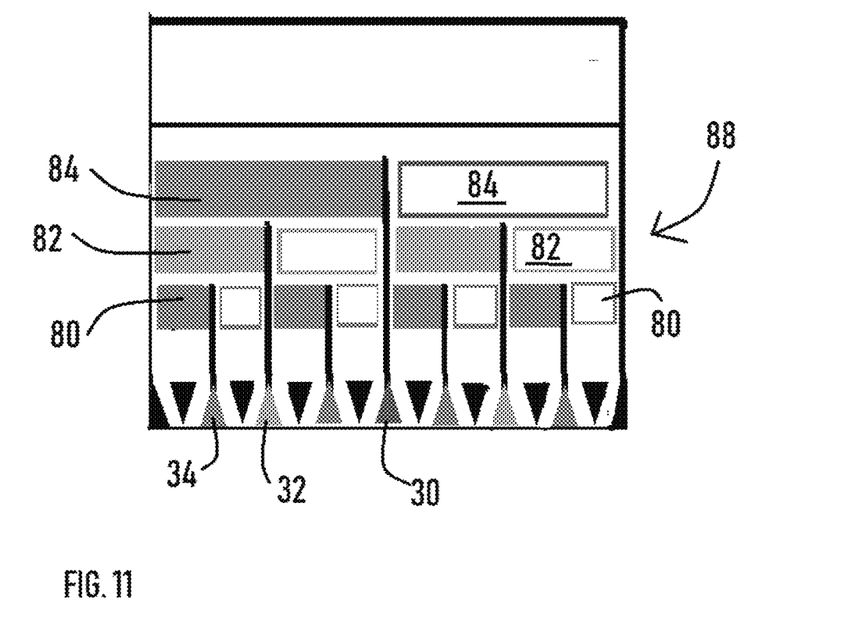
FIG. 11 is a front view of the tenth embodiment described herein.

FIG. 11 shows a tenth embodiment 88 of a one-inch section of a ruler or measuring tape. The tenth embodiment 88 is similar in many respects to the ninth embodiment 86 but where there was a space between numerator bands 74 in the ninth embodiment 86, the tenth embodiment 88 provides for numerator bands in outline form. These outline forms represent non-reduced fractions as an aid in counting to the correct reduced fraction. In particular, the tenth embodiment 88 shows eighth-inch numerator bands 80 extending across the unit of measure in series and in a linear fashion parallel to the straight edge 20. The eighth-inch numerator bands 80 alternate from solid color to outline form where the outline is in the same color as the solid colored bands. In FIG. 11, there are eight eighth-inch numerator bands 80, alternating across the unit of measure with the first eighth-inch band extending from the "zero" point to the one-eighth inch mark. This band is displayed in solid color form. In FIG. 11, the color of the eighth-inch numerator bands 80 is green. The second eighth-inch numerator band 80 extends from the one-eighth inch mark to the one-fourth inch mark. This eighth-inch numerator band 80 is displayed in outline form where the outline color is the same as the solid colored eighth-inch numerator bands, in this case green. This pattern is repeated across the unit of measure so that there are eight eighth-inch numerator bands 80. Four of the eighth-inch numerator bands 80 are solid color, and four are in outline form where the outline color is the same as the solid color, in this case green.

There are four quarter-inch numerator bands 82 in FIG. 11. The first quarter-inch numerator band 82 extends from the "zero" mark to the one-fourth inch mark. That band 82 is in solid form. The second quarter-inch numerator band 82 extends from the one-fourth inch mark to the one-half inch mark and is in outline form in the same color as the first quarter-inch numerator band, in this case orange. Each quarter inch numerator band 82 is one-fourth of an inch wide extending across the unit of measure in series and parallel to the straight edge 20.

There are two half-inch numerator bands 84 in FIG. 11. The first half-inch numerator band 84 extends from the "zero" mark and extends to the one-half inch mark, and is displayed in solid color, in this case blue. The second half-inch numerator band 84 extends from the one-half inch mark to the one inch mark and is in outline form where the color of the outline is the same as the solid colored first half-inch numerator band, in this case blue. Moreover, both half-inch numerator bands 84 are the same color as the half-inch indicia 30 of the denominator. Thus, when measuring, the user can easily measure length on the ruler 12 on the basis of ease of reference of the display of the ruler and clarity of indicia.

Figure 12:
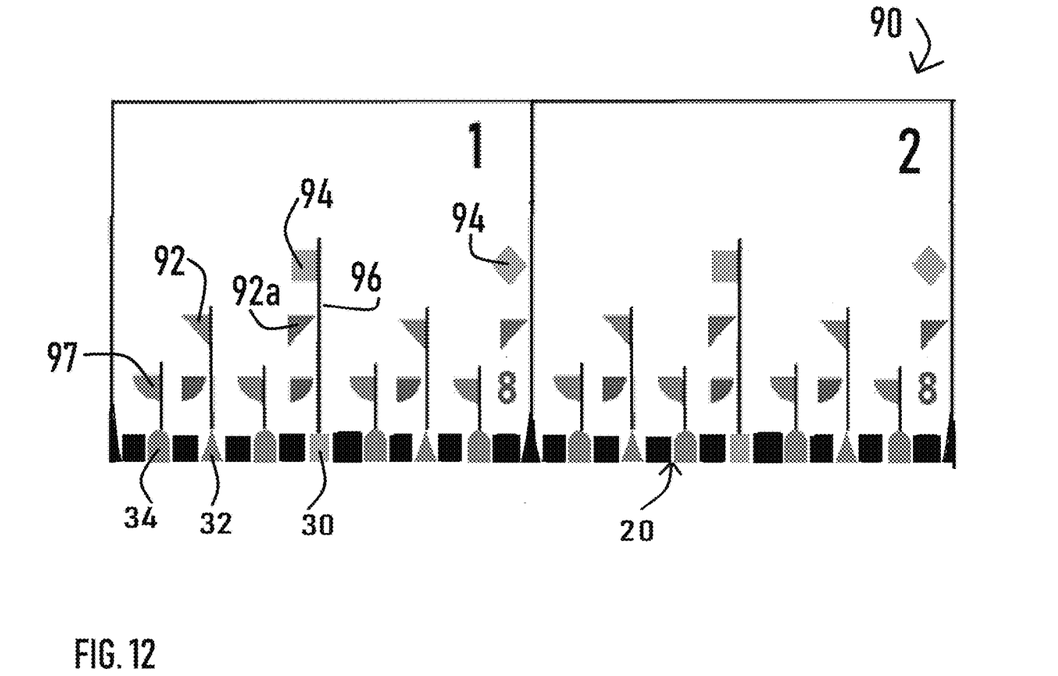
FIG. 12 is a front view of the eleventh embodiment described herein.

An eleventh embodiment 90 of a two-inch section of a ruler or measuring tape is shown in FIG. 12. The eleventh embodiment 90 is similar to the tenth embodiment 88 in that the color coded numerator values and the matching color denominator values are indicated. However, the eleventh embodiment 90 uses color, shape and spacing to distinguish the numerator values from each other. For instance, the quarter-inch numerator indicators are not shown as numerator bands. Rather the quarter-inch increments are indicated with right angle triangles 92 and the base of the triangle for the one-fourth inch mark matches in color with the right angle triangles. The right angle triangles are displayed so that one leg extends horizontally, and the other leg extends vertically downward. The first triangle 92 displays the triangle where one of the legs extends left and the other downward. The second triangle 92a is oriented with one leg extending right and the other downward. The remaining triangles 92 alternate in orientation as described above. All of the triangles are displayed in a horizontal row spaced apart from each other along the unit of measure. All of the triangles 92 are displayed in the same color, in the embodiment of FIG. 12, that color is green. In addition to the numerator indicators in the form of triangles 92, the one-fourth denominator indicia 32 are also indicated in the same color, in this case green.

In the eleventh embodiment 90 of FIG. 12, the half-inch numerator indicia are displayed as squares 94. The first square 94 is located at the one-half inch mark. The square 94 is adjacent to a line 96 that extends upwardly from a square base that is the one-half denominator indicia 30. The one-half denominator indicia 30 and the square 94 are colored the same, in FIG. 12 the color is orange. In addition, the first square 94 is oriented with the bottom edge being parallel to the straight edge 20. The second square 94 which is located at the one-inch mark is oriented so that the edges are at a 45 degree angle to the straight edge 20 and appears as a diamond shape. In addition, all of the squares 94 are arranged in series in a horizontal row, the row being parallel to the straight edge 20. The row of squares 94 being above the row of eight-inch numerator indicators, triangles 92. As with the triangles 92, the squares are colored to match the color of the one-half inch denominator indicia 30, which in FIG. 12 is orange.

The eighth-inch numerator indicator for the eleventh embodiment 90 is shown as a quarter-circle 97. The first quarter-circle 97 is displayed with the curved part pointing towards the "zero" mark and located at the one-eighth inch mark. The second semi-circle 97 is displayed with the curved part pointing towards the one inch mark and is located at the two eighths-inch mark. Like the other numerator indicators, the eighth-inch numerator indicators are colored the same and colored to match the eighth-inch denominator indicia 34, which in FIG. 12 is blue. The quarter-circles 97 are arranged in series in a row, the row being parallel to the straight edge 20. The quarter-circles are located below the triangles 92 which are located below the squares 94. This arrangement enables a user to quickly understand the indicia and easily make an accurate length measurement.

Figure 13:
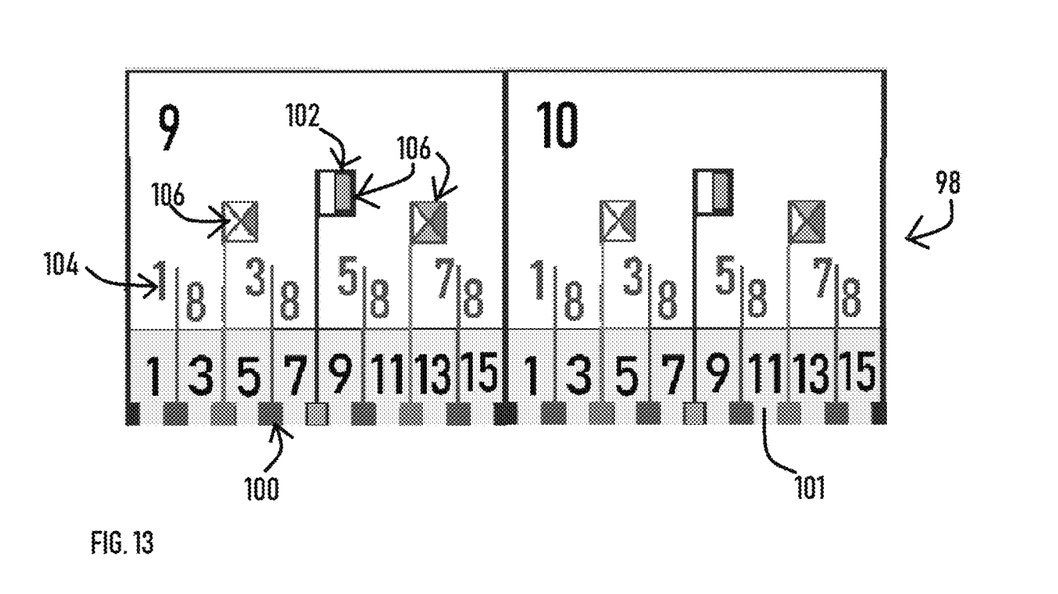
FIG. 13 is a front view of the twelfth embodiment described herein.

A twelfth embodiment 98 of a two-inch section of a ruler or measuring tape is shown in FIG. 13. The twelfth embodiment 98 is similar in some respects to the sixth embodiment 68 of FIG. 8. The twelfth embodiment 98 uses color, numbers and shapes to provide for a ruler that is easy to use and enables the user to make quick and accurate measurements. The twelfth embodiment 98 includes square gradations 100 to indicate gradations of one-sixteenth of an inch. The square gradations 100 are one-sixteenth of an inch wide and spaced apart by one-sixteenth of an inch. The square gradations 100 are indicated in color as being blue or green or navy. The spaces 101 are colored in yellow.

The twelfth embodiment 98 further includes linear indicia 102 that connect to the square gradations 100. The linear indicia 102 are located at every one-eight of an inch on the unit of measure and are colored in blue. The square gradations 100 connected to the linear indicia 102 are also colored in the same blue. In addition to the linear indicia 102, the one-eighth indicia include numbers 104 alternately located at every odd one-eighth mark. In particular, the one-eighth numbers displayed are ⅛, ⅜, ⅝ and ⅞. The numbers are displayed in the same color as the linear indicia 102 and the square gradations 100 associated with the one-eighth marks. The numbers 104 are arranged in a row where the row is parallel to the straight edge 20 and above the square gradations 100.

The twelfth embodiment 98 also includes fractional flags 106 located at the end of lines marking each one-fourth and one-half inch mark. The flags 106 are color coded to match the one-fourth and one-half inch denominator indicia respectively. Moreover, the one-quarter inch flags are square shaped and divided into fourths. The first one-fourth inch flag 106 is displayed at the one-fourth inch mark and one of the four quarter divisions of the flag is colored. The second one-fourth inch flag 106 is located at the three-fourths inch mark and three of the four quarters of the flag is colored. These flags 106 help to indicate to the user the numerator value at that location. The one-fourth and three fourths inch flags 106 are colored to match the one-fourth denominator indicia 64 which in FIG. 13 is green. The one-fourth inch flags 106 are displayed in a row where the row is parallel to the straight edge 20. The row of one-fourth inch flags 106 are located above the linear indicia 102 and numbers 104 indicating the one-eighth gradations.

The flag 106 marking the half-inch mark is located at the one-half inch mark. The flag 106 is divided into halves and one-half of the flag is solid color while the other half is in outline. The flag 106 is the same color as the linear indicia 102 associated with the one-half inch mark, which in FIG. 13 is navy blue. The half-inch flag 106 is located above the row of one-fourth inch flags.

Figure 14:
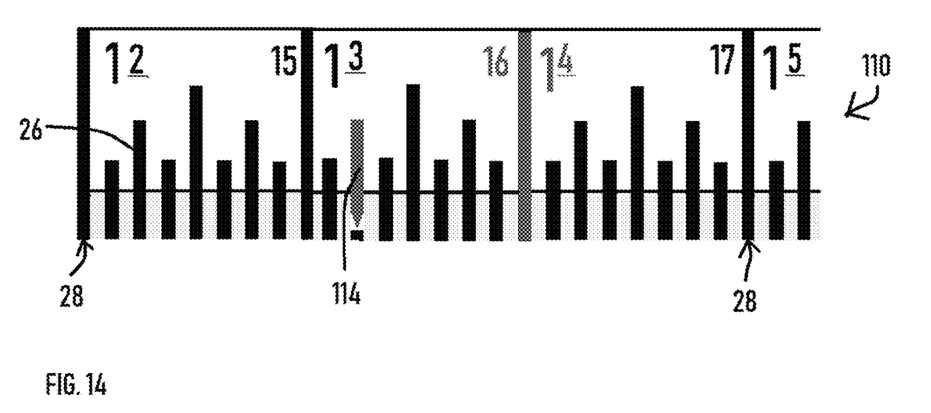
FIG. 14 is a front view of the thirteenth embodiment described herein.

In construction, carpenters or construction framers are often required to calculate out the locations for anchoring construction materials such as sheet rock or floorboards. These materials typically are supplied in standard dimensions. For example, standard sheet rock is typically four feet wide by eight feet long. Wall studs are typically spaced at either sixteen or twenty-four inches. The anchoring side of the stud has a typical width of one and one-half inches. Thus, in order to ensure that the sheet rock is properly anchored to the wall stud, the framer must calculate that the edge of the sheet rock needs to be located three-fourths (or half of the stud width of one and one-half inches) of an inch away from the anchor point. When using a standard carpenter's ruler, making these demarcations and calculations can be challenging. A thirteenth embodiment 110 aids in this endeavor.

The thirteenth embodiment 110 is shown in detail in FIG. 14 and is a multi-inch sectional of a ruler or measuring tape. The thirteenth embodiment 110 includes half, quarter, eighth and sixteenth indicia 26 all having a width of one-sixteenth of an inch as described in previous embodiments. In addition, the thirteenth embodiment 110 has end unit indicia 28 that are one thirty-second of an inch wide. In addition, the thirteenth embodiment 110 provides for edge indicia 112 located every sixteen, nineteen and three sixteenths, and twenty-four inches to indicate to the user the location for the leading edge of the sheetrock, floorboard or the like. The frequency of sixteen, nineteen and three sixteenths, and twenty-four inches is to coincide with the standard spacing of joists, rafters, and studs as being spaced either sixteen, nineteen and three sixteenths, or twenty-four inches apart. Using modern and common construction materials and methods, distinct markings would be made for multiples of 16 inches; with ¾ inch setbacks, for multiples of 19³⁄₁₆ inches with 1 inch setbacks, and for multiples of 24 inches with setbacks of both ¾ inches and 1¾ inches.

The edge indicia 112 in FIG. 14 is in the form of a contrasting color to the whole number inch indicia and the mark's number. It is anticipated that the edge indicia 112 may take other forms such as a marking in the shape of an arrow in a contrasting color, a contrasting background, or the like. The thirteenth embodiment 110 further includes a setback indicia 114 for locating the setback, or half of the stud's width, from the stud center which is where the edge of the material should be located to ensure that anchoring occurs at the stud center. The setback indicia 114 is also located every sixteen inches and may also be located every twenty-four inches. In FIG. 14, the setback indicia 114 is in the form of an arrow in a contrasting color to the surrounding indicia 26. As with the spacing indicia 112, it is anticipated that the setback indicia 114 may take a number of different shapes, and can be any number of different contrasting colors to draw the attention of the user to the setback location.

Figure 15:
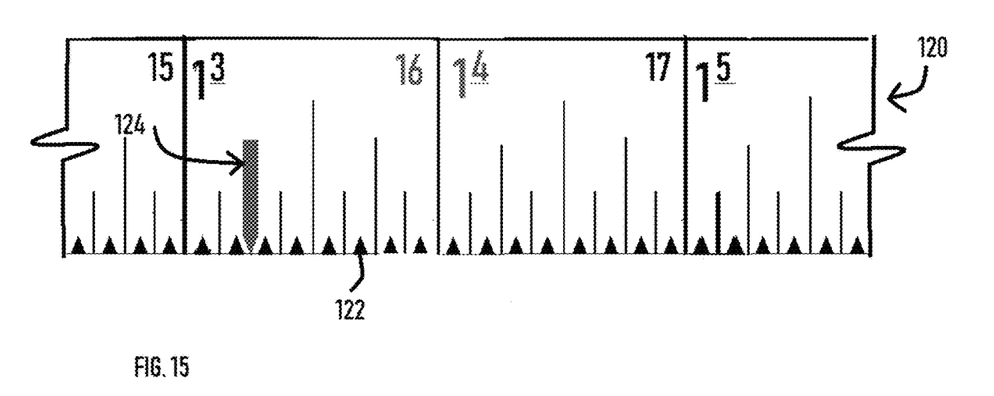
FIG. 15 is a front view of the fourteenth embodiment described herein.

FIG. 15 shows a fourteenth embodiment 120 of a multi-inch section of a ruler or tape measure. The fourteenth embodiment 120 is similar in many respects to the thirteenth embodiment 110. The indicia 26 are indicated by lines at the one-half, one-fourth, and one-eighth increments. However, the indicia for the one-sixteenth increments are indicated by isosceles triangles 122 where the apex of the triangle indicates that one-sixteenth increment. The bases of each side of the triangle intersects the straight edge 20 at thirty-second increments. The large rectangular indicium 124 indicates the ¾ inch setback (which is half of 1½) from the sixteen inch measure for spacing joists, sheetrock, etc. The numeric figures at the top of the embodiment 110, indicate both the overall length in inches and in feet. Specifically, the first numeric indicator "15" indicates 15 inches in overall length. The second indicator "1³" indicates 1 foot and 3 inches in overall length.

Thus, it is apparent that the embodiments herein provided fully satisfy the objects, aims and advantages set forth above. It should be appreciated that while the embodiments herein are preferred embodiments, it is understood to that it is not intended to limit the embodiments as disclosed. On the contrary, it is intended to cover all alternatives, modifications and equivalents as may be included in the spirit and scope as described herein and defined by the appended claims. Furthermore, the terms "upper", "lower", "left", "right" and the like are used for reference purposes only and are not intended to be limiting in any way. It should be further noted that the figures in this application are not drawn to scale and are for illustration purposes only. It is appreciated that in use, the embodiments described herein would be made to scale and thus the indicia described here would be use for measurement purposes.

The invention claimed is:

1. A measuring ruler comprising:
   a straight edge located along at least one length of a ruler;
   a first surface having a background color, and a second opposed surface;
   a set of spaced apart indicia located on the first surface of the ruler along the at least one length, the indicia being oriented perpendicular to the straight edge, whereby the first indicium and the last indicium of a whole number unit measurement length appear half as wide as all remaining fractional indicia, the indicia width is ¹⁄₁₆ of an inch, and; a singular linear indicia perpendicular to the spaced apart indicia and at a location approximately halfway along the length of the shortest length of spaced apart indicia, wherein the area between the space apart indicia and between the linear indicia and straight edge has a contrasting color to the indicia and the first surface background color, and wherein linear measurement of a ¹⁄₃₂ is located along the straight edge at the intersection of indicia and background color of the first surface.

2. The measuring ruler of claim 1 wherein at least one number is displayed on the first surface at the fractional level indicated by the indicia length, the number indicating the fractional numerator value and the location of the number indicating the denominator value.

3. A measuring ruler comprising:
   a straight edge located along at least one length of the ruler;
   a first surface and a second opposed surface;
   a set of spaced apart denominator indicia located on the first surface of the ruler along the at least one length, the indicia being oriented perpendicular to the straight edge, and indicating fractional denominator portions of a whole number unit of measurement; and
   at least one numerator indicium indicating a fractional numerator portion of a whole number unit of measurement, the numerator indicium being oriented perpendicular to the denominator indicia, wherein the at least one numerator indicium is displayed colinear to another indicium of differing fractional value with the smallest fractional value indicia located closest to the straight edge.

4. The measuring ruler of claim 3 wherein at least one indicium is in the form of a shape divided into fractional portions therein with the fractional portions of the shape corresponding to the location of the indicium along the fractional portion of the measuring unit.

5. The measuring ruler of claim 3 wherein the numerator indicium is a number.

6. A system for locating a securing point for securing material having an edge to a structure, the measuring ruler comprising:
   a straight edge located along at least one length of the ruler;
   a ruler first surface having a background color, and a second opposed ruler surface;
   a set of spaced apart fractional indicia each indicia having an indicia width, and each indicia located along the first surface of the ruler along the at least one length, the indicia being oriented perpendicular to the straight edge, and the first indicium and the last indicium of a whole number unit measurement length having a width half as wide as all remaining fractional indicia;
   at least one piece of material for securing to a structure, the material having a first surface, an opposed surface and at least one edge;

at least one indicia displayed on the ruler first surface for marking the securing location for the material edge; and at least one setback indicia for marking the location at which to secure the material to the structure.

* * * * *